(12) United States Patent
Salter et al.

(10) Patent No.: US 9,969,323 B2
(45) Date of Patent: May 15, 2018

(54) VEHICLE LIGHTING SYSTEM EMPLOYING A LIGHT STRIP

(71) Applicant: Ford Global Technologies, LLC, Dearborn, MI (US)

(72) Inventors: Stuart C. Salter, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 14/519,882

(22) Filed: Oct. 21, 2014

(65) Prior Publication Data

US 2015/0138808 A1 May 21, 2015

Related U.S. Application Data

(63) Continuation-in-part of application No. 14/086,442, filed on Nov. 21, 2013.

(51) Int. Cl.
| | |
|---|---|
| *B60Q 1/26* | (2006.01) |
| *B60Q 1/32* | (2006.01) |
| *B60Q 1/38* | (2006.01) |
| *F21Y 103/10* | (2016.01) |
| *F21Y 115/10* | (2016.01) |

(52) U.S. Cl.
CPC .............. *B60Q 1/268* (2013.01); *B60Q 1/26* (2013.01); *B60Q 1/323* (2013.01); *B60Q 1/38* (2013.01); *F21S 41/16* (2018.01); *F21S 43/14* (2018.01); *F21S 43/26* (2018.01); *B60Q 2400/20* (2013.01); *F21Y 2103/10* (2016.08); *F21Y 2115/10* (2016.08)

(58) Field of Classification Search
CPC . B60Q 1/26; B60Q 1/268; B60Q 1/38; B60Q 2400/20; F21S 48/215; F21S 48/2212; F21Y 2103/10
USPC .......................... 362/487, 503, 509–510, 545
See application file for complete search history.

(56) References Cited

U.S. PATENT DOCUMENTS

| | | | |
|---|---|---|---|
| 2,486,859 A | 11/1949 | Meijer et al. | |
| 3,308,257 A | 3/1967 | Thompson | |
| 4,035,754 A | 7/1977 | Kleinbohl | |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Jason Rogers; Price Heneveld LLP (57) ABSTRACT

A vehicle lighting system is provided herein. The vehicle lighting system includes a light strip including an elongated housing and at least one light source disposed inside the housing. A controller is configured to control a light output of the at least one light source. A viewable portion of the housing is configured to luminesce in response to excitation by light emitted from the at least one light source.

19 Claims, 4 Drawing Sheets

(56) References Cited

U.S. PATENT DOCUMENTS

| | | | |
|---|---|---|---|
| 6,286,983 B1 * | 9/2001 | Macher | B60Q 1/2665 315/169.3 |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,570,147 B2 | 8/2009 | Muller | |
| 7,575,349 B2 | 8/2009 | Bucher et al. | |
| 7,635,212 B2 | 12/2009 | Seidler | |
| 7,726,856 B2 * | 6/2010 | Tsutsumi | B60Q 1/2607 362/231 |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0097121 A1 | 5/2006 | Fugate | |
| 2006/0226678 A1 * | 10/2006 | Chang | B60Q 1/268 296/180.1 |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0218113 A1 | 8/2012 | Stanek et al. | |
| 2012/0223801 A1 | 9/2012 | Moon | |
| 2012/0280528 A1 | 11/2012 | Dellock et al. | |
| 2013/0092965 A1 | 4/2013 | Kijima et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20030088587 A | 11/2003 |
| KR | 20060026531 A | 3/2006 |
| WO | 2006047306 A1 | 5/2006 |
| WO | 2014068440 A1 | 5/2014 |

* cited by examiner

VEHICLE LIGHTING SYSTEM EMPLOYING A LIGHT STRIP

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a light strip is provided and is disposed proximate to a vehicle window. The light strip includes an elongated housing and a first and a second light source disposed inside the housing. A viewable portion of the housing is configured to luminesce in response to excitation by light emitted from at least one of the first light source and the second light source.

According to another aspect of the present invention, a light strip is provided and is disposed on an exterior portion of a vehicle. The light strip includes an elongated housing and at least one light source disposed inside the housing. A viewable portion of the housing is configured to luminesce in response to excitation by light emitted from the at least one light source.

According to another aspect of the present invention, a vehicle lighting system is provided. The vehicle lighting system includes a light strip including an elongated housing and at least one light source disposed inside the housing. A controller is configured to control a light output of the at least one light source. A viewable portion of the housing is configured to luminesce in response to excitation by light emitted from the at least one light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting system that advantageously employs one or more photoluminescent structures configured to convert light received from an associated light source and re-emit the light at a different wavelength.

Figure 1A:
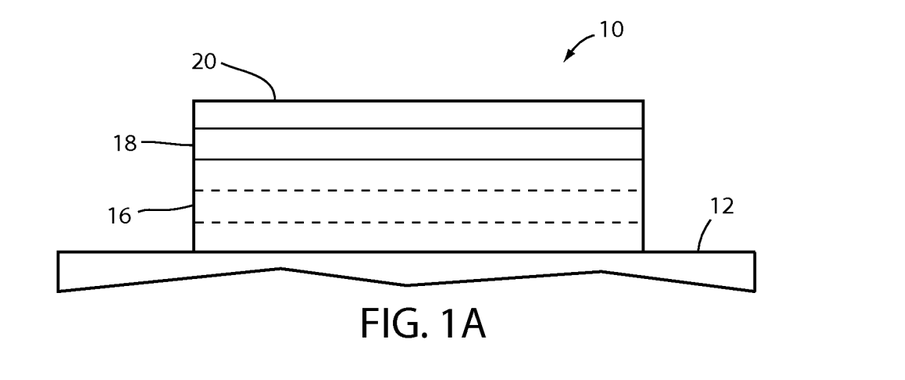
FIG. 1A illustrates a photoluminescent structure coupled to a substrate, according to one embodiment.
Figure 1B:
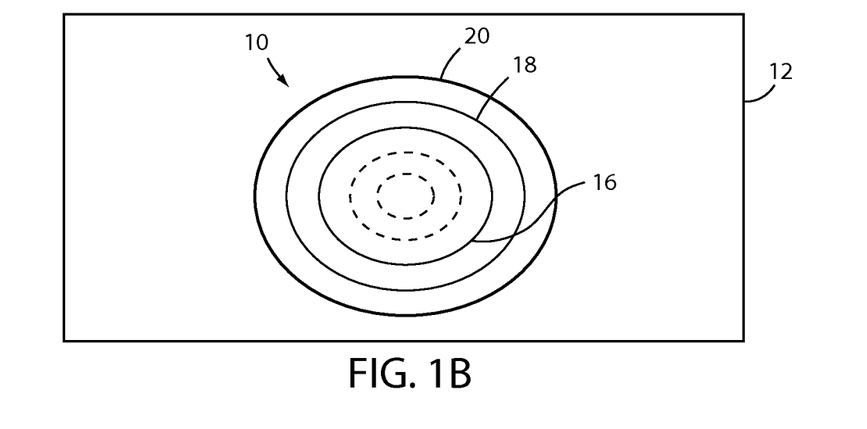
FIG. 1B illustrates a photoluminescent structure coupled to a substrate, according to another embodiment.
Figure 1C:
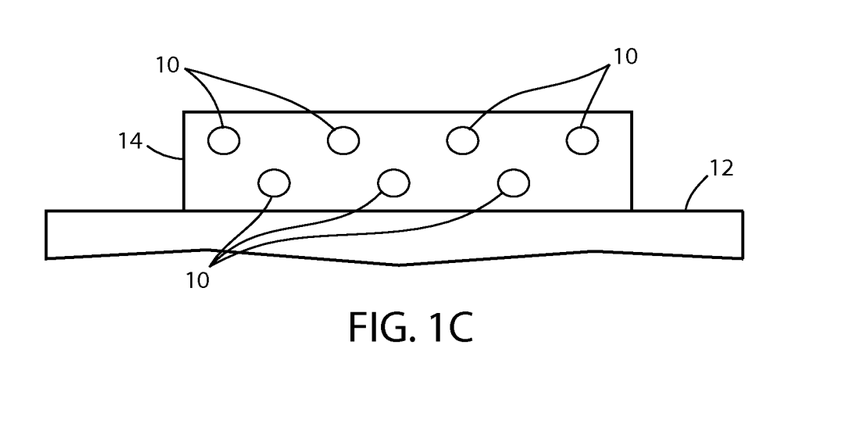
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
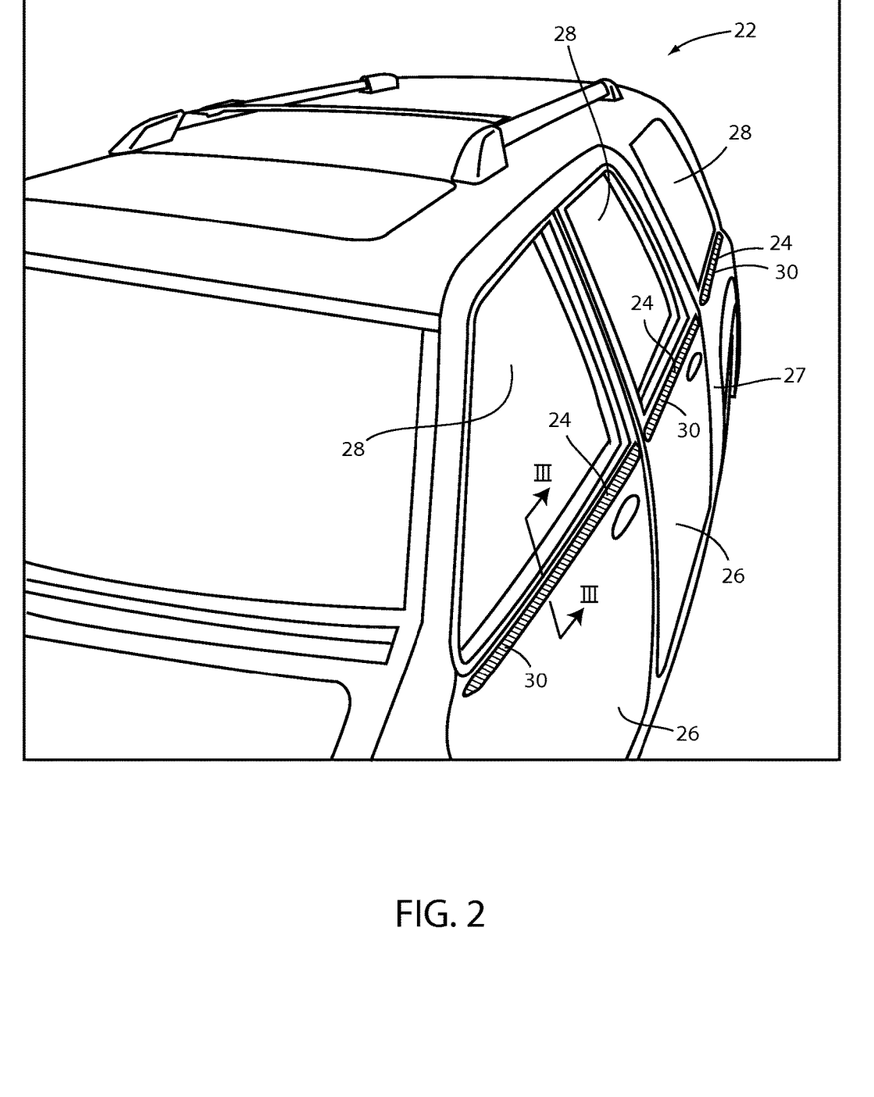
FIG. 2 illustrates a light strip provided on a vehicle.

Referring to FIG. 2, a vehicle 22 is generally shown having one or more light strips 24 located on an exterior portion of the vehicle 22, exemplarily shown as driver side doors 26 and body 27. Each light strip 24 may be arranged as a door or body accent and may be disposed proximate to one or more driver side windows 28. The light strips 24 may be positioned just below the window 28 and may each include a viewable portion 30 configured to luminesce in response to excitation by light emitted from a light source (not shown). The luminescence exhibited by the viewable portion 30 of a given light strip 24 may provide one or more distinct lighting functions. For instance, the viewable portion 30 may luminesce in a first color to function simply as a styling element. In another instance, the viewable portion 30 of each light strip 24 may luminesce in a second color that is visually distinct from the first color to provide a notification to a viewer. One example includes flashing the viewable portion 30 of a light strip 24 to function as a turn signal. For purposes herein, a viewer should be understood to include passengers inside the vehicle and/or individuals in the surrounding area. While not shown, it should be understood that light strips 24 may be similarly provided on the passenger side doors and body. It should also be understood that light strips 24 may additionally, or alternatively, be provided in other vehicle locations such as, but not limited to, the front, rear, bottom, roof, and interior portions of the vehicle 22.

Figure 3:
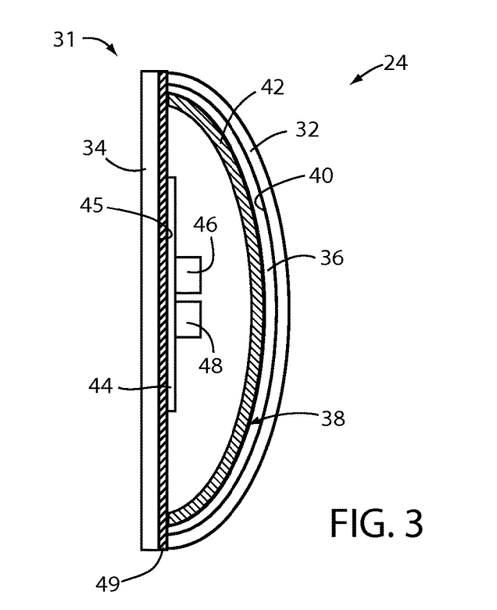
FIG. 3 is a cross-sectional view of a light strip taken along lines III-III of FIG. 2.

Referring to FIG. 3, a cross-section of a light strip 24 is shown according to one embodiment. The light strip 24 includes a housing 31 having a front portion 32 corresponding to the viewable portion 30 shown in FIG. 2 and a rear portion 34. The front portion 32 may be arcuate whereas the rear portion 34 may be substantially linear. Each portion 32, 34 may be constructed from a rigid material such as, but not limited to, plastic. In addition, the front portion 32 should be substantially light permeable and may be assembled to the rear portion 34 via sonic or laser welding. Alternatively, the front and rear portions 32, 34 may be assembled together via low-pressure insert molding.

Viewable portions of the housing 31 (e.g., the front portion 32) may be metalized to give the light strip 24 a metallic outer appearance. In one embodiment, a metallic layer 36 may be applied to the underside of the front portion 32 via partial vacuum deposition. The metallic layer 36 should be light permeable to allow light to pass therethrough from an inner side 38 to an outer side 40.

The light strip 24 may also include a photoluminescent structure 42 coupled to the front portion 32 of the housing 31. According to one embodiment, the photoluminescent structure 42 covers the metallic layer 36 and may be applied over the metallic layer 36 as a paint or other coating. In an alternative embodiment, the photoluminescent structure 42 may be molded or otherwise integrated into the front portion 32 of the housing 31.

Referring still to FIG. 3, the light strip 24 may further include a printed circuit board (PCB) 44 that is disposed inside the housing 31 and may extend the length of the light strip 24. The PCB 44 may be secured to an inner surface 45 of the rear portion 34 and disposed to face the front portion 32. A first light source 46 and a second light source 48 may be provided on the PCB 44. Light sources 46 and 48 may be vertically aligned and may be powered by a vehicle power supply or other power supply. A white solder mask (not shown) may be applied to the PCB 44 to reflect light incident thereon and a reflecting layer 49, such as white paint, may cover the inner surface 45 of the rear portion 34.

Figure 4:
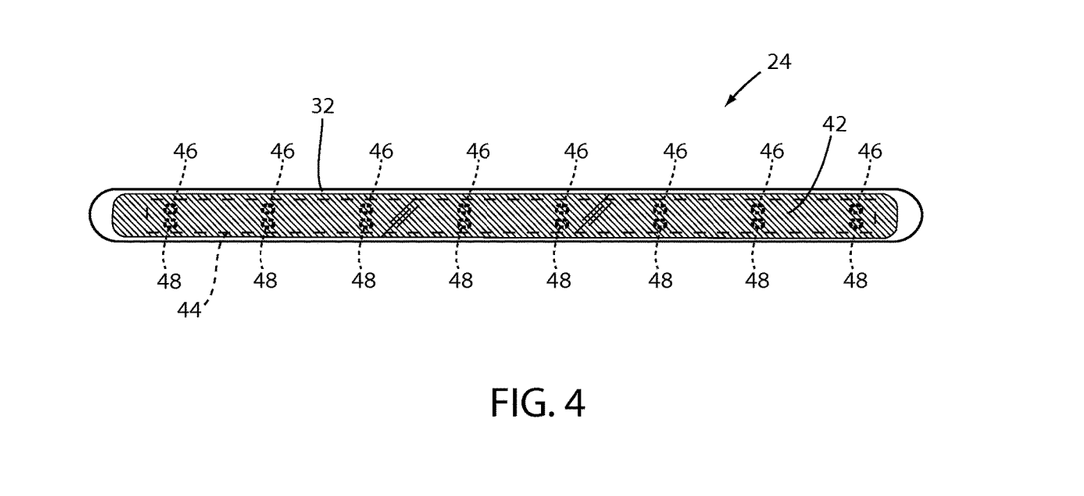
FIG. 4 illustrates a lighting arrangement as viewed from the front of a light strip.

Light sources 46 and 48 may each be configured to emit non-focused light that excites a substantial portion of the photoluminescent structure 42 and may each be configured as various light types, such as, but not limited to, halogen lights, fluorescent lights, light emitting diodes (LEDs), organic LEDs (OLEDs), and polymer LEDs (PLEDs). As exemplarily shown in FIG. 4, light source 46 may be configured as a plurality of LEDs spaced longitudinally across the PCB 44 and oriented to face the front portion 32 of the light strip 24. Similarly, light source 48 may be configured as a plurality of LEDs spaced longitudinally across the PCB 44 and oriented to face the front portion 32 of the light strip 24. The respective light sources 46, 48 may be connected in series or in parallel and are not limited to any particular number. However, by positioning the PCB 44 further away from the front portion 32, or said differently, closer toward the rear portion 34, fewer light sources 46, 48 may be required to efficiently illuminate the photoluminescent structure 42, thereby reducing build cost.

In operation, portions of the housing 31 that are covered by the photoluminescent structure 42 may luminesce in response to excitation by light emitted from light sources 46 and 48. Specifically, the photoluminescent structure 42 may be configured to perform an energy conversion on light emitted from light sources 46 and 48. Each blight source 46, 48 may emit a distinct wavelength of light to excite the photoluminescent structure 42. In response, the photoluminescent structure 42 may convert light emitted from light source 46 into a light that is expressed in a first color and may convert light emitted from light source 48 into a light that is expressed in a second color that is visually distinct from the first color. According to one implementation, the energy conversion occurs via the down conversion process. In addition, light sources 46 and 48 may each be embodied as an LED that emits a distinct wavelength of light that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs. The converted light emitted from the photoluminescent structure 42 may correspond to a visible light, which includes the portion of the electromagnetic spectrum that can be detected by the human eye (~390-700 nanometers in wavelength) and may be expressed in a variety of colors defined by a single wavelength (e.g. red, green, blue) or a mixture of multiple wavelengths (e.g. white). Thus, it should be understood that the photoluminescent structure 42 may be configured such that converted light emitted therefrom is expressed as unicolored or multicolored light. For example, the photoluminescent structure 42 may be configured to convert light emitted from light source 46 into white light, which may provide a cost effective alternative to using white LEDs. Additionally, the photoluminescent structure 42 may be configured to convert light emitted from light source 48 into an amber colored light.

According to one embodiment, the photoluminescent structure 42 is substantially Lambertian, that is, the apparent brightness of the photoluminescent structure 42 is substantially constant regardless of an observer's angle of view. As a consequence, converted light may be emitted outwardly from the photoluminescent structure 42 in numerous directions. With respect to the embodiment shown in FIG. 3, a portion of the converted light may be transmitted through the metallic layer 36 and outputted from the front portion 32 of the housing 31, thereby causing the front portion 32 to exhibit luminescence. Another portion of the converted light may be emitted into the interior of the housing 31 and become incident on the reflecting layer 49 and/or the white solder mask of the PCB 44. As a result, the converted light may be redirected back toward the photoluminescent structure 42 and transmitted therethrough before finally being outputted from the housing 31 via the metallic layer 36 and the front portion 32. This helps to ensure that the front portion 32 exhibits an optimal amount of luminescence. Furthermore, the provision of the reflecting layer 49 and the white solder mask of the PCB 44 also helps to ensure that an optimal amount of light emitted from light sources 46 and 48 reaches the photoluminescent structure 42. For example, it is possible for a portion of the light emitted from one or both of the light sources 46, 48 to reflect off the photoluminescent structure 42, thereby resulting in decreased excitation of the photoluminescent structure 42. Thus, by providing a means to redirect the light back toward the photoluminescent structure 42, wayward propagating light originating from light sources 46 and/or 48 and contained inside the housing 31 is given another opportunity to excite the photoluminescent structure 42.

Figure 5:
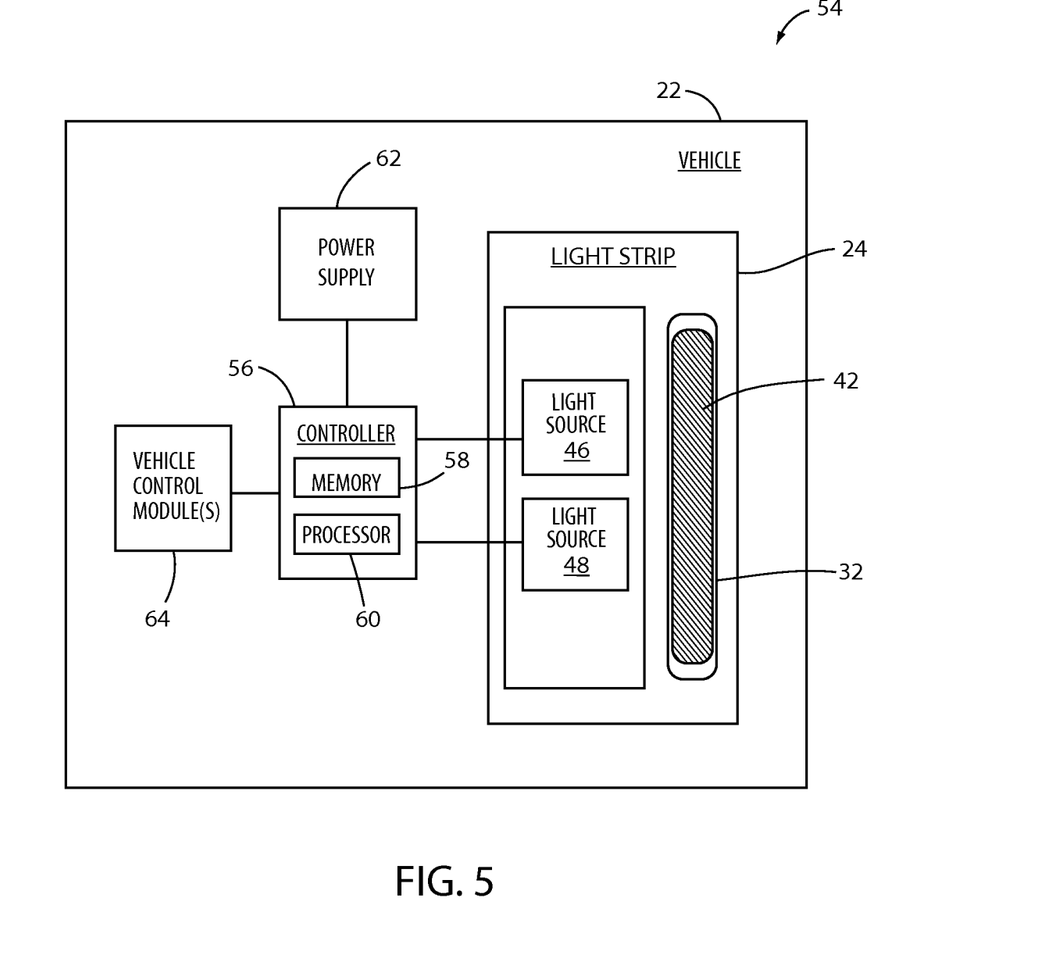
FIG. 5 is a box diagram of a light strip being implemented in a vehicle lighting system.

Referring to FIG. 5, the light strip 24 may be utilized in a vehicle lighting system 54 that is implemented in a vehicle (e.g., vehicle 22). The system 54 may include a controller 56 in communication with the light sources 46, 48 of the light strip 24 and configured to control the light output thereof. The controller 56 may include a memory 58 having instructions contained therein that are executed by a processor 60. The controller 56 may be coupled to a power supply 62 of the vehicle 22 to supply electrical power to the light sources 46, 48. The controller 56 may control the light output of each light source 46, 48 based on feedback received from one or more vehicle control modules 64 such as, but not limited to, a body control module, engine control module, steering control module, brake control module, the like, or a combination thereof. By controlling the light output of the light source 46, 48, the resulting luminescence of the front portion 32 may be utilized to provide different lighting functions.

According to one implementation, the controller 56 may operate light source 46 to provide accent lighting and may operate light source 48 as a turn signal. In operation, the controller 56 may activate only one of the light sources 46, 48 at a time or both of the light sources 46, 48 simultaneously. In one implementation, the controller 56 may deactivate light source 48 while light source 46 is active. As a result, the photoluminescent structure 42 will only perform an energy conversion on light emitted from light source 46, causing the front portion 32 of the light strip 24 to luminesce in the first color (e.g., white). When a vehicle operator uses a turn signal, the controller 56 may deactivate light source 46 and activate light source 48, thereby causing the photoluminescent structure 42 to perform an energy conversion only on light emitted from light source 48, which causes the front portion 32 of the light strip 24 to luminesce in the second color (e.g., amber). The controller 56 may operate light source 48 to periodically excite (e.g., pulse) the photoluminescent structure 42, thereby causing the front portion 32 to exhibit periodic luminescence. The time between each pulse may be selected such that the front portion 32 flashes at intervals that mimic the blinking lights of the vehicle 22 when a turn signal is activated. In one embodiment, a light strip 24 may be provided on each side of the vehicle 22, wherein one of the light strips 24 flashes to indicate a left turn and the other light strip 24 flashes to indicate a right turn. For viewing purposes, the controller 56 may operate light sources 46 and 48 at a higher intensity during the day and a lower intensity at night. Doing so enables the luminescence exhibited by the front portion 32 of the light strip 24 to be sufficient visible based on current lighting conditions.

Accordingly a vehicle lighting system employing a luminescent light strip has been advantageously described herein. The lighting system provides various benefits including an efficient and cost-effective means to produce illumination on a vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A light strip comprising:
   an elongated housing disposed beneath a vehicle window and extending a length thereof, the housing having a rear portion and a front portion that is arcuate;
   a first and a second light source coupled to an inner surface of the rear portion;
   a reflecting layer disposed on the inner surface of the rear portion and contacting the front portion, the reflecting layer configured to reflect incident light emitted by the first and second light sources;
   a photoluminescent structure coupled to the front portion and separate from the first and second light source, the photoluminescent structure configured to luminesce in response to excitation by light emitted from at least one of the first light source and the second light source; and
   a metallic layer that is light permeable and is disposed between the front portion and the photoluminescent structure, wherein the metallic layer and the photoluminescent structure are contoured to the front portion so as to be arcuate.

2. The light strip of claim 1, wherein the first and second light sources are vertically aligned, and wherein the first light source is configured to emit a first wavelength of light and the second light source is configured to emit a second wavelength of light that is different than the first wavelength of light.

3. The light strip of claim 2, wherein the photoluminescent structure is configured to luminesce in a first color in response to excitation by the first wavelength of light and a second color in response to excitation by the second wavelength of light.

4. The light strip of claim 1, wherein at least one of the first light source and the second light source is operated at a first intensity during the day and a second intensity at night.

5. The light strip of claim 1, wherein at least one of the first and second light source is operated to provide periodic excitation, thereby causing the front portion of the housing to exhibit periodic luminescence.

6. A light strip comprising:
   an elongated housing disposed beneath a vehicle window and extending a length thereof, the housing having a rear portion and a front portion that is arcuate;
   at least one light source disposed on a printed circuit board coupled to the rear portion;
   a reflecting layer contacting both the rear portion and the front portion and configured to reflect incident light emitted by the at least one light source; and
   a metallic layer that is light permeable and is disposed between the front portion and the photoluminescent structure, wherein the metallic layer and the photoluminescent structure are contoured to the front portion so as to be arcuate; and
   wherein the front portion is configured to luminesce in response to excitation by light emitted from the at least one light source.

7. The light strip of claim 6, wherein the at least one light source comprises a first plurality of light emitting diodes configured to emit a first wavelength of light and a second plurality of light emitting diodes configured to emit a second wavelength of light.

8. The light strip of claim 7, wherein the front portion of the housing is configured to luminesce in a first color in response to excitation by the first wavelength of light and a second color in response to excitation by the second color of light.

9. The light strip of claim 6, wherein the least one light source is operated at a first intensity during the day and a second intensity at night.

10. The light strip of claim 6, wherein the at least one light source is operated to provide periodic excitation, thereby causing the front portion of the housing to exhibit periodic luminescence.

11. The light strip of claim 6, wherein the at least one light source is a turn signal.

12. The light strip of claim 6, wherein the housing is disposed proximate to a vehicle window.

13. A vehicle lighting system comprising:
   a light strip disposed below a vehicle window and including an elongated housing having a rear portion and front portion that is arcuate;
   at least one light source coupled to the rear portion;
   a reflecting layer contacting both the rear portion and the front portion and configured to reflect incident light emitted by the at least one light source;
   a controller configured to control a light output of the at least one light source;

a photoluminescent structure coupled to the front portion and separate from the at least one light source, the photoluminescent structure configured to luminesce in response to excitation by light emitted from the at least one light source; and a metallic layer that is light permeable and is disposed between the front portion and the photoluminescent structure, wherein the metallic layer and the photoluminescent structure are contoured to the front portion so as to be arcuate.

14. The vehicle lighting system of claim 13, wherein the at least one light source comprises a first plurality of light emitting diodes configured to emit a first wavelength of light and a second plurality of light emitting diodes configured to emit a second wavelength of light.

15. The vehicle lighting system of claim 14, wherein the photoluminescent structure is configured to luminesce in a first color in response to excitation by the first wavelength of light and a second color in response to excitation by the second wavelength of light.

16. The vehicle lighting system of claim 13, wherein the controller operates the at least one light source at a first intensity during the day and a second intensity at night.

17. The vehicle lighting system of claim 13, wherein the controller operates the at least one light source to provide periodic excitation to cause the front portion of the housing to exhibit periodic luminescence.

18. The vehicle lighting system of claim 17, wherein the controller operates the at least one light source as a turn signal.

19. The vehicle lighting system of claim 13, wherein the housing is disposed proximate to a vehicle window.

\* \* \* \* \*